United States Patent [19]

Saitou

[11] Patent Number: 5,589,770

[45] Date of Patent: Dec. 31, 1996

[54] MECHANICAL SENSOR FOR DETECTING STRESS OR DISTORTION WITH HIGH SENSITIVITY

[75] Inventor: Shinji Saitou, Suita, Japan

[73] Assignee: Matsushita Electric Industrial Co., Ltd., Osaka, Japan

[21] Appl. No.: 494,221

[22] Filed: Jun. 23, 1995

[30] Foreign Application Priority Data

Jun. 27, 1994 [JP] Japan .................................. 6-144436

[51] Int. Cl.⁶ ........................................................ G01L 1/00
[52] U.S. Cl. ............................................ 324/209; 73/776
[58] Field of Search ................................ 324/209, 235, 324/262; 73/776, 779; 338/32 R

[56] References Cited

U.S. PATENT DOCUMENTS 4,884,453  12/1989  Hoffman et al. ........................ 73/776

*Primary Examiner*—Walter E. Snow
*Attorney, Agent, or Firm*—Fish & Richardson P.C.

[57] ABSTRACT

A mechanical sensor, comprising a ferromagnetic layer having magnetostriction, a ferromagnetic layer having magneto-resistance effect, a magnetic field generating means which excites these ferromagnetic layers, and a substrate which supports all these elements integrally, can be attained, which is small, thin, highly sensitive, and is capable of integration, by detecting a change of magnetic flux density passing through the ferromagnetic layers resulting from a change of magnetic properties caused by stress as a change of resistance value arising from magneto-resistance effect. As a result, a small, thin, and highly sensitive mechanical sensor can be provided using stress magnetic effect. Furthermore, based on the anisotropy of detection sensitivity, intensity of the stress along a certain direction can be detected selectively.

18 Claims, 6 Drawing Sheets

MECHANICAL SENSOR FOR DETECTING STRESS OR DISTORTION WITH HIGH SENSITIVITY

FIELD OF THE INVENTION

This invention relates to a mechanical detection sensor. In particular, this invention relates to a mechanical sensor which is capable of detecting stress or distortion with high sensitivity.

BACKGROUND OF THE INVENTION

Recently, following the tendency of electronic devices towards becoming smaller and thinner, a mechanical sensor which is used in electronic devices is required to become smaller. As an example of mechanical sensor using stress magnetic effect, a sensor which is already put in practical use is comprised of a cylinder on which an amorphous magnetic alloy thin band having positive saturation magnetostriction constant is adhered and a solenoid coil which detects permeability change in the thin band resulting from applied stress (for example, SAE TECHNICAL PAPER SERIES 920700).

This conventional type of mechanical sensor is provided with a coil produced by winding wires (diameter: more than 20 to 30 μm) in the form of solenoid and a ferromagnetic bulk (thickness: 20 to 30 μm).

However, since the above-mentioned conventional mechanical sensor uses a solenoid wound coil and a ferromagnetic bulk, it is difficult to attain a smaller and more integrated sensor. Furthermore, it is necessary to convert inductance change of the coil into voltage, so that an amplification circuit becomes complicated, compared with converting resistance change into voltage.

An example of plane mechanical sensor which is more suitable for attaining compact size is a distorted gage using a metallic foil, but this sensor has only one thousandth of sensitivity, compared with using stress magnetic effect.

SUMMARY OF THE INVENTION

An object of this invention is to solve the above-mentioned problems in conventional systems by providing a small, thin, and highly sensitive mechanical sensor which can be integrated.

In order to accomplish these and other objects and advantages, a mechanical sensor of this invention comprises a ferromagnetic layer having magnetostriction, a ferromagnetic layer having a magneto-resistance effect, a magnetic field generating means which excites these ferromagnetic layers, and a substrate which supports all these elements integrally, wherein a change of magnetic flux density passing through the ferromagnetic layers resulting from a change of magnetic properties due to stress is detected as a change of resistance value arising from the magneto-resistance effect.

It is preferable in the above-mentioned configuration that the magnetic field which excites the ferromagnetic layers is oriented in a direction which is substantially parallel to a direction of the stress.

Furthermore, it is preferable in the above-mentioned configuration that an electric insulating layer is further provided between the substrate and the ferromagnetic layer having magnetostriction.

In addition, it is preferable in the above-mentioned configuration that an electric insulating layer is further provided between the ferromagnetic layer having magnetostriction and the ferromagnetic layer having magneto-resistance effect.

Also, it is preferable in the above-mentioned configuration that the ferromagnetic layer having magneto-resistance effect is connected to input-output terminals of electric power.

It is preferable in the above-mentioned configuration that a non-magnetic layer is further provided between the ferromagnetic layer having magnetostriction and the ferromagnetic layer having magneto-resistance effect for magnetically separating these two layers, and these ferromagnetic layers are excited through electric current passing through the ferromagnetic layer having magneto-resistance effect.

Furthermore, it is preferable in the above-mentioned configuration that the ferromagnetic layer and the non-magnetic layer are formed by a vapor phase film formation method or by a liquid phase film formation method.

It is preferable in the above-mentioned configuration that the mechanical sensor comprises a ferromagnetic layer having magnetostriction, a ferromagnetic layer having magneto-resistance effect, a non-magnetic conductive layer formed between these two ferromagnetic layers, and a non-magnetic insulating layer for electrically insulating these layers, wherein these ferromagnetic layers are excited through an electric current passing through the conductive layer.

In addition, it is preferable in the above-mentioned configuration that the non-magnetic conductive layer is connected to input-output terminals of electric power which is provided separately from the input-output terminals of electric power connected to the ferromagnetic layer.

Furthermore, it is preferable in the above-mentioned configuration that the ferromagnetic layers, the non-magnetic conductive layer, and the non-magnetic insulating layer are formed by a vapor phase film formation method or by a liquid phase film formation method.

In addition, it is preferable in the above-mentioned configuration that two ferromagnetic layers having magnetostriction are provided in parallel in a cross-sectional direction, and a gap section created between these two ferromagnetic layers is provided with a ferromagnetic layer having magneto-resistance effect which is positioned substantially parallel to these ferromagnetic layers and also with magnet layers disposed on both outside positions of the two ferromagnetic layers having magnetostriction for exciting these ferromagnetic layers.

Also, it is preferable in the above-mentioned configuration that the ferromagnetic layers and the magnet layer are formed by a vapor phase film formation method or by a liquid phase film formation method.

It is preferable in the above-mentioned configuration that the ferromagnetic layer having magnetostriction comprises amorphous magnetostrictive alloy.

Furthermore, it is preferable in the above-mentioned configuration that the amorphous magnetostrictive alloy comprises at least one alloy selected from the group comprising Fe-Cr-Si-B-based, Fe-Nb-Si-B-based, Fe-V-Si-B-based, Fe-Co-Si-B-based, Fe-W-Si-B-based, Fe-Ni-Cr-Si-B-based, Fe-Ni-Nb-B-based, and Fe-Ni-Mo-B-based alloy.

In addition, it is preferable in the above-mentioned configuration that the amorphous magnetostrictive alloy comprises $Fe_{75}Cr_4Si_{12.5}B_{8.5}$.

Also, it is preferable in the above-mentioned configuration that the ferromagnetic layer having magneto-resistance effect comprises a NiFe alloy film.

It is preferable in the above-mentioned configuration that the electric insulating layer comprises $SiO_2$.

Furthermore, it is preferable in the above-mentioned configuration that the substrate comprises one substance selected from the group comprising metal, glass, and ceramics.

According to the configuration of this invention, the mechanical sensor comprises a ferromagnetic layer having magnetostriction, a ferromagnetic layer having magneto-resistance effect, a magnetic field generating means which excites these ferromagnetic layers, and a substrate which supports all these elements integrally, wherein a change of magnetic flux density passing through the ferromagnetic layers resulting from a change of magnetic properties due to stress can be detected as a change of a resistance value arising from magneto-resistance effect. As a result, a small, thin, and highly sensitive mechanical sensor which can be integrated can be attained. In other words, due to the thin film process, a mechanical sensor which is extremely small and uses stress magnetic effect on the plane can be formed, and this mechanical sensor can be easily applied to the tendency of compact-size, integration, and high sensitivity.

As mentioned above, it is preferable that the magnetic field which excites the ferromagnetic layers is oriented in a direction which is substantially parallel to a direction of the stress. In this way, it is possible to detect permeability change of the ferromagnetic layer having magnetic flux arising from magnetic anisotropy induced in the stress direction most sensitively.

Also, when a non-magnetic layer is further provided between the ferromagnetic layer having magnetostriction and the ferromagnetic layer having magneto-resistance effect for magnetically separating these two layers, and when these ferromagnetic layers are excited through electric current passing through the ferromagnetic layer having magneto-resistance effect, the ferromagnetic layer having magneto-resistance effect serves as a magnetic field generating means, thereby simplifying the structure. In addition, the generated magnetic power forms a small loop in its vicinity, so that distortion in a micro-part can be detected efficiently.

Furthermore, according to the preferable configuration of this invention, the ferromagnetic layer and the non-magnetic layer are formed by a vapor phase film formation method or by a liquid phase film formation method. This enables accurate manufacturing of the shape of the magnetic circuit, and the magnetic circuit can be produced even finer and in a solid-state. It is preferable that the vapor phase film formation method is performed by a vacuum deposition method or by a sputtering method. According to the vacuum deposition method, a film is formed in a high vacuum of more than $10^{-5}$ Torr, in which an object substance is evaporated by an electron beam heating or a resistance heating. According to the sputtering method, a film is formed at vacuum degree of $10^{-2}$ to $10^{-5}$ Torr in an atmosphere mainly composed of argon, in which an object substance is subjected to a sputtering evaporation by ionized argon. The liquid phase film formation method is preferably performed by coating.

As mentioned above, it is preferable that the mechanical sensor comprises a ferromagnetic layer having magnetostriction, a ferromagnetic layer having magneto-resistance effect, a non-magnetic conductive layer formed between these two ferromagnetic layers, and a non-magnetic insulating layer for electrically insulating these layers, wherein these ferromagnetic layers are excited through electric current passing through the conductive layer. As a result, electric current for exciting the ferromagnetic layers and electric current for sensing can be controlled independently, which results in higher degree of freedom in the designing of magnetic circuits and electric circuits. Also, since the generated magnetic flux forms a small loop, distortion in a micro-part can be detected efficiently.

When the ferromagnetic layers, the non-magnetic conductive layer, and the non-magnetic insulating layer are formed by a vapor phase film formation method or by a liquid phase film formation method, this enables accurate manufacturing of the shape of the magnetic circuit, and the magnetic circuit can be produced even finer and in a solid-state.

As mentioned above, it is preferable that two ferromagnetic layers having magnetostriction are provided in parallel in a cross-sectional direction, and a gap section created between these two ferromagnetic layers is provided with a ferromagnetic layer having a magneto-resistance effect which is positioned substantially parallel to these ferromagnetic layers and also with magnet layers disposed on both outside positions of the two ferromagnetic layers having magnetostriction for exciting these ferromagnetic layers. Accordingly, it is no longer necessary to pass electric current for excitation, which results in lower consumption of electric power.

It is also preferable for the ferromagnetic layers and the magnet layer to be formed by a vapor phase film formation method or by a liquid phase film formation method, since this enables accurate manufacturing of the shape of the magnetic circuit, and the magnetic circuit can be produced even finer and in a solid-state.

When the ferromagnetic layer having magnetostriction comprises an amorphous magnetostrictive alloy, detection of dynamic amount can be performed accurately. In particular, it is preferable that the amorphous magnetostrictive alloy comprises at least one alloy selected from the group comprising Fe-Cr-Si-B-based, Fe-Nb-Si-B-based, Fe-V-Si-B-based, Fe-Co-Si-B-based, Fe-W-St-B-based, Fe-Ni-Cr-Si-B-based, Fe-Ni-Nb-B-based, and Fe-Ni-Mo-B-based alloy. Especially, $Fe_{75}Cr_4Si_{12.5}B_{8.5}$ is suitable. The composition of an amorphous magnetostrictive alloy film was $Fe_{75}Cr_4Si_{12.5}B_{8.5}$ in atom%; temperature of crystallization was 460° C.; and saturation magnetostrictive constant was 22 ppm.

According to this invention, the mechanical sensor comprises a ferromagnetic layer having magnetostriction, a ferromagnetic layer having magneto-resistance effect, a magnetic field generating means which excites these ferromagnetic layers, and a substrate which supports all these elements integrally, wherein a change of magnetic flux density passing through the ferromagnetic layers resulting from a change of magnetic properties due to stress is detected as a change of resistance value arising from magneto-resistance effect. As a result, a small, thin, and highly sensitive mechanical sensor which can be integrated can be attained. In this way, stress magnetic effect can be used to provide a small, thin, and highly sensitive mechanical sensor. In addition, based on the anisotropy of the detection sensitivity the strength of stress along a certain direction can be detected selectively.

DETAILED DESCRIPTION OF THE INVENTION

This invention will be explained in detail by referring to the following illustrative examples and attached figures. The examples are illustrative and should not be construed as limiting the invention in any way.

In the following examples, a ferromagnetic layer having magnetostriction is referred to as a magnetostrictive layer, and a ferromagnetic layer having magneto-resistance effect is referred to as a magneto-resistance element.

EXAMPLE 1

Figure 1A:
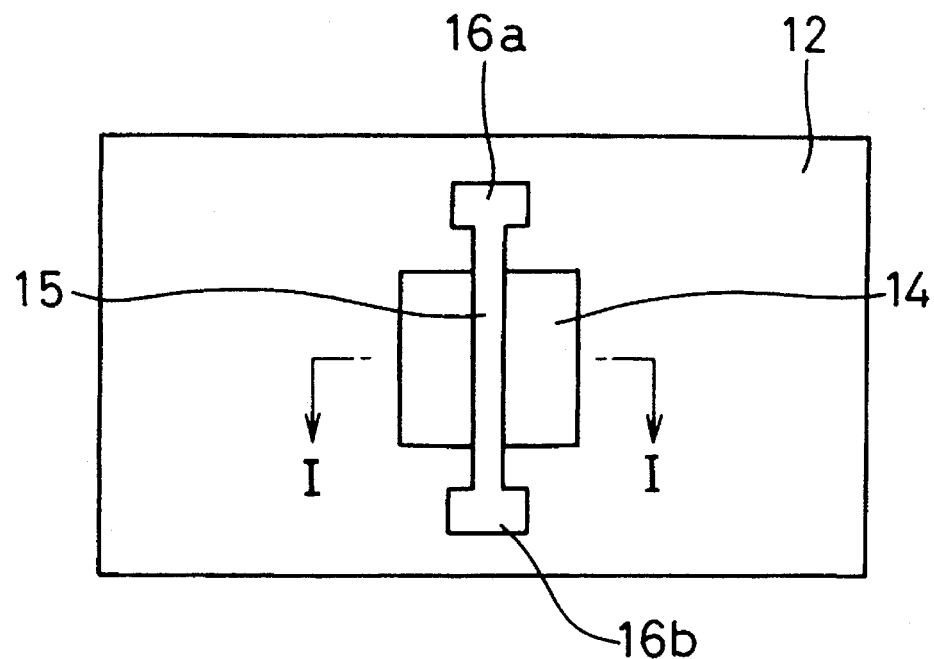
FIG. 1(a) is a plan view showing a mechanical sensor in Example 1 of this invention.
Figure 1B:
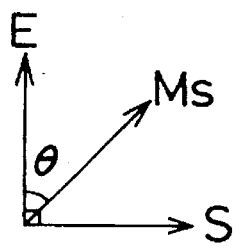
FIG. 1(b) is a view showing magnetic directions of a mechanical sensor in Example 1 of this invention.
Figure 2:
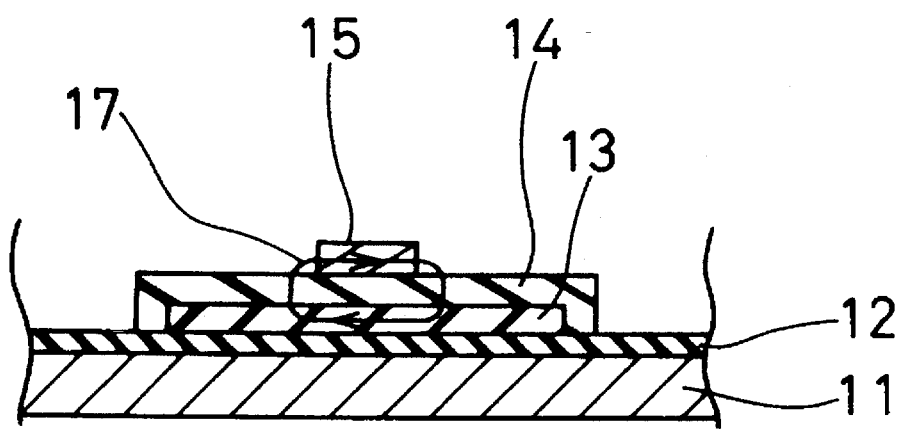
FIG. 2 is a cross-sectional view taken on line I—I of FIG. 1(a).

FIG. 1(a) is a plan view showing a configuration of a mechanical sensor in this embodiment. FIG. 2 is a cross-sectional view taken on line I—I of FIG. 1(a). The configuration of a mechanical sensor in this embodiment will be explained by referring to these two figures.

In the central part on top of a substrate 11 having a long side 10 mm, a short side 5 mm, and a thickness 0.5 mm, a magnetostrictive layer 13 comprising a ferromagnetic layer having magnetostriction is formed with an area of 2 mm by 2 mm (2 square mm) and a thickness of 1 µm. The substrate 11 can be made of any non-magnetic body, such as metal, ceramics, and so on. In this embodiment, titanium is used for the substrate 11. The substrate surface is covered with an insulating layer 12 comprising $SiO_2$ of 0.3 µm thick. The shape of the substrate 11 is not limited to a flat form shown in FIG. 2 or a rectangular form which is present on the back side of the insulating layer 12 in FIG. 1(a). The magnetostrictive layer 13 in FIG. 2 comprises a Fe-group amorphous alloy film formed by a sputtering method and contains Fe, Cr, Si, and B. The composition is $Fe_{75}Cr_4Si_{12.5}B_{8.5}$. Relative permeability of the magnetostrictive layer 13 at 1 MHz is 1000, and saturation magnetostriction constant is +22 ppm.

On the surface of this magnetostrictive layer 13, an insulating layer 14 (thickness: 0.2 µm) comprising $SiO_2$ is formed by a sputtering method. On top of the insulating layer 14, a magneto-resistance element 15 is formed linearly in a short side direction of the substrate 11 (width 50 µm, length 3 mm, thickness 0.1 µm), and this magneto-resistance element 15 is connected to input-output terminals 16a and 16b. The insulating layer 14 comprises a non-magnetic body and also serves for magnetically separating the magnetostrictive layer 13 and the magneto-resistance element 15. The magneto-resistance element 15 comprises a NiFe alloy film manufactured by a vacuum deposition method. At the time of deposition, a magnetic field is oriented in a longitudinal direction of the magneto-resistance element 15, and one-axis magnetic anisotropy is given in which the longitudinal direction serves as an axis of easy magnetization. In other words, the magneto-resistance element 15 possesses anisotropic magneto-resistance effect.

Next, an operation of the mechanical sensor in this embodiment will be explained. Among the in-plane directions of the substrate 11, the longitudinal direction of the substrate is defined as S-direction, and the longitudinal direction of the magneto-resistance element 15 (axis direction of easy magnetization of the magneto-resistance element 15) is defined as E-direction. Furthermore, stress was applied in the S-direction of the substrate surface, and property change was measured.

When a magnetic field is not applied, magnetization Ms of the magneto-resistance element 15 is arranged in the axis direction of easy magnetization (E-direction). A magnetic field is generated when electric current is passed through the magneto-resistance element 15, and magnetic flux 17 passing through the magneto-resistance element 15 and the magnetostrictive layer 13 is generated in the S-direction, as shown in FIG. 2. As a result, Ms is rotated in the S-direction and forms an angle θ with the E-direction. It is well-known that resistance changes by rotation of magnetization in a magneto-resistance element having anisotropic magneto-resistance effect, and this resistance change can be shown in the following formula (Formula 1). In this formula, R represents a value of resistance; $R_0$ represents a value of resistance when θ is 0, and ΔR is called anisotropic magneto-resistance and is a constant indicating a resistance change.

(Formula 1)

$$R = R_0 - \Delta \bar{R} \cdot \sin^2\theta$$

It is clear from the above-mentioned formula (Formula 1) that the value of resistance decreases as the magnetic field becomes stronger, and the resistance change reaches saturation at the moment when Ms is oriented to the S-direction (θ=90°). The magnetic field at the time of saturation is called an anisotropic magnetic field (Hk), and the magneto-resistance element in this embodiment has Hk of 480 A/M. The magneto-resistance element comprising a ferromagnetic body has the advantage of possessing higher sensitivity in a low magnetic field than with a semiconductor magneto-resistance element or a Hall element, and this magneto-resistance element is also capable of excitation in a low magnetic field. In this embodiment, electric current is adjusted such that resistance becomes approximately $R_0 - \frac{1}{2}\Delta R$ under the condition of applying no stress, and the sensor is made to operate in an intermediate condition of resistance change.

As for an operation at the time when stress is applied, when stress is applied to the substrate 11, stress is generated in the S-direction of the magnetostrictive layer 13. When stress is applied to the ferromagnetic layer having magnetostriction, magnetic anisotropy is induced in the stress direction due to magnetic elastic energy, so that permeability of the stress direction changes. Since the direction of the magnetic flux 17 and that of the stress match, magnetic flux density (magnetic field) of the magnetic flux 17 changes. As a result, due to the rotation of Ms, the value of resistance in the magneto-resistance element 15 changes. A magnetostrictive layer having positive saturation magnetostriction constant is used in this embodiment, so that the permeability increases at the time of tensile stress and decreases at the time of compressive stress. Therefore, the value of resistance in the magnetic resistive element 15 decreases at the time of tensile stress and increases at the time of compressive stress. The reason why the operation point at the time of no stress is adjusted to $R_0-\frac{1}{2}\Delta R$ is to improve linearity of the resistance change. Furthermore, the reason why the magneto-resistance element 15 is positioned in this embodiment in such a way that the longitudinal direction (axis direction of easy magnetization) of the magneto-resistance element having anisotropic magneto-resistance effect forms 90° against the applied stress direction is to make the direction of arising magnetic flux match with the direction of the stress and to attain the maximum sensitivity against the stress. When the direction of the magnetic flux and the direction of the stress create a gap, the magnetic flux density changes as much as the component of magnetic flux direction of the stress, and the resistance change $\Delta r$ to be obtained can be indicated in the following formula (Formula 2). Here, $\theta'$ represents an angle formed between the magnetic flux direction and the stress direction, and $\Delta r_0$ represents a value of $\Delta r$ when $\theta'$ is 0.

(Formula 2)

$$\Delta r = \Delta r_0 \cdot \cos\theta'$$

According to the above-mentioned formula (Formula 2), change caused by the stress becomes 0 when $\theta'=90°$. Thus, when a temperature compensation is performed, the magneto-resistance element for temperature compensation should be formed in this direction.

Finally, according to the results of the property measurement, 1.2% of resistance change was obtained when stress was applied to create −50 ppm to +50 ppm of distortion on the surface of the substrate 11.

EXAMPLE 2

Figure 3:
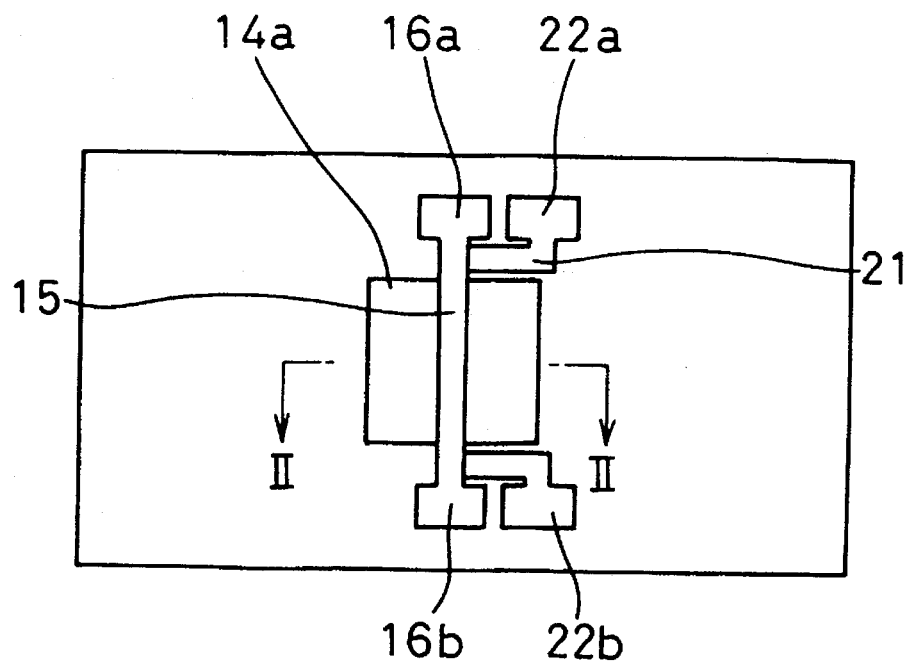
FIG. 3(a) is a plan view showing a mechanical sensor in Example 2 of this invention.
FIG. 3(b) is a view showing magnetic directions of a mechanical sensor in Example 2 of this invention.
Figure 3:
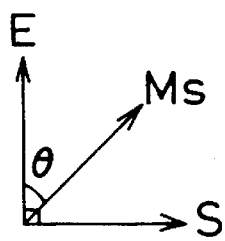
Figure 4:
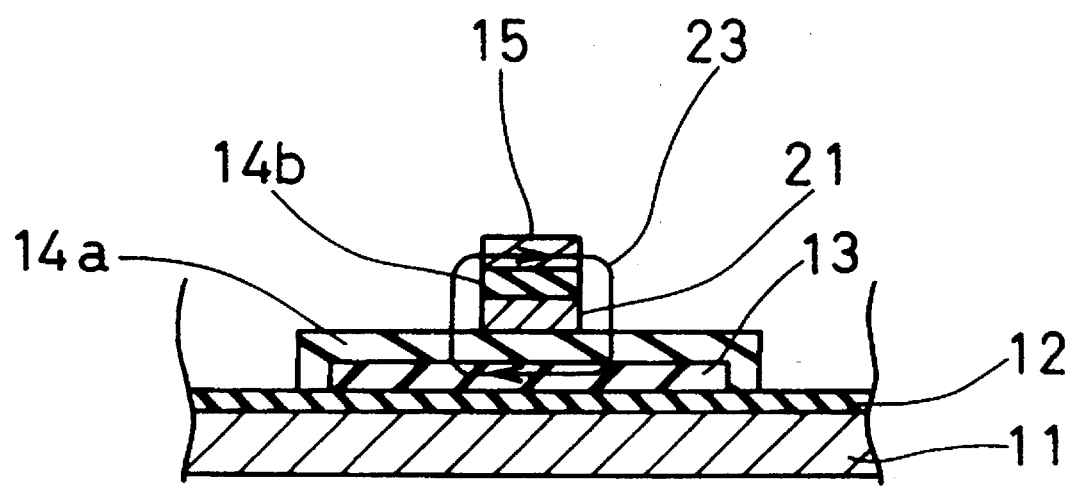
FIG. 4 is a cross-sectional view taken on line II—II of FIG. 3(a).

FIG. 3(a) is a plan view showing a configuration of a mechanical sensor (Example 2) of this invention. FIG. 4 is a cross-sectional view taken on line II—II of FIG. 3(a). The configuration of a mechanical sensor in this embodiment will be explained by referring to these two figures.

The structure, material, and manufacturing process of the mechanical sensor in this embodiment are approximately the same as those of the mechanical sensor in Example 1. The mechanical sensor of this embodiment differs only in that a non-magnetic conductor 21 which is disposed to excite a magnetostrictive layer 13 and a magneto-resistance element 15 is positioned via insulating layers 14a, 14b between the magnetostrictive layer 13 and the magneto-resistance element 15. The non-magnetic conductor 21 is connected to terminals 22a and 22b. The non-magnetic conductor 21 comprises an aluminum film formed by a sputtering method and has a thickness 1 μm and the same width as that of the magneto-resistance element 15. According to this configuration, electric current for excitation of the ferromagnetic layer and electric current for sensing can be controlled independently, so that degree of freedom on a magnetic circuit or on an electric circuit is enhanced. Furthermore, since the electric current for excitation is passed through the thick conductive layer whose conductive rate is high, a temperature change caused by exothermic of the magneto-resistance element 15 becomes small.

An operation in this embodiment is the same as that in Example 1. A magnetic field is generated when electric current is passed through the non-magnetic conductor 21, and magnetic flux 23 passing through the magneto-resistance element 15 and the magnetostrictive layer 13 is generated in the S-direction, as shown in FIG. 4. When stress is applied in the S-direction, magnetic flux density of the magnetic flux 23 changes, and the value of resistance in the magneto-resistance element 15 changes. Also in this embodiment, the non-magnetic conductor 21 is made to form 90° against the S-direction so that the stress direction matches the excitation direction.

The change of resistance value against the stress was, as in Example 1, 1.2% when the stress was applied to create −50 ppm to +50 ppm of distortion on the surface of the substrate 11.

EXAMPLE 3

Figure 5:
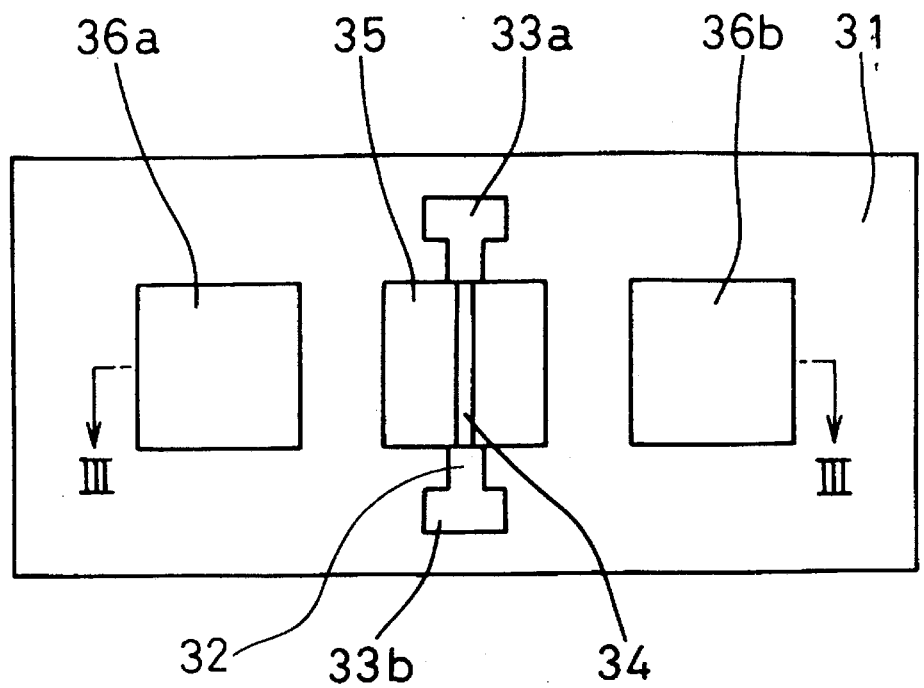
FIG. 5(a) is a plan view showing a mechanical sensor in Example 3 of this invention.
FIG. 5(b) is a view showing magnetic directions of a mechanical sensor in Example 3 of this invention.
Figure 5:
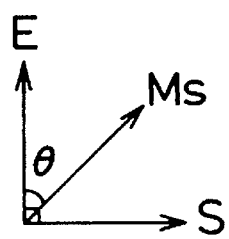
Figure 6:
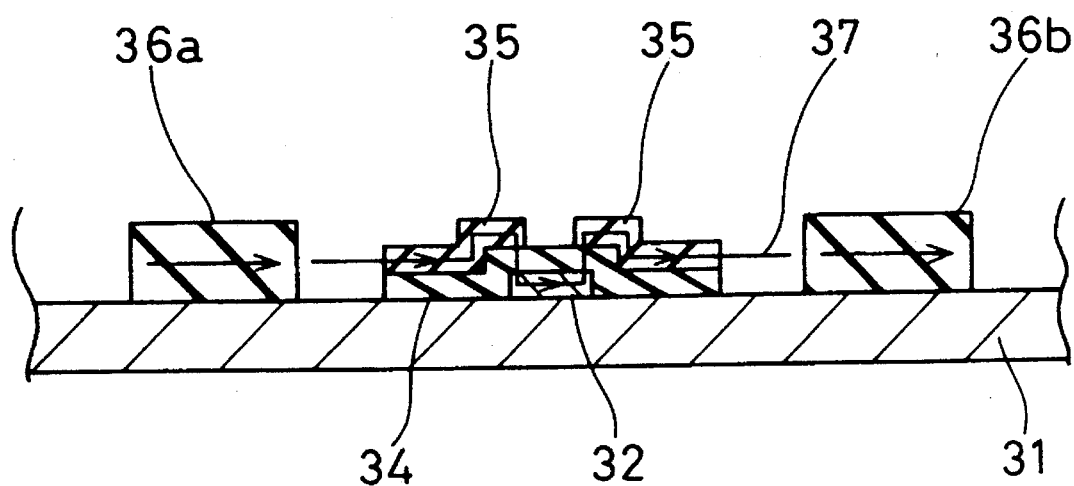
FIG. 6 is a cross-sectional view taken on line III—III of FIG. 5(a).

FIG. 5(a) is a plan view showing a configuration of a mechanical sensor (Example 3) of this invention. FIG. 6 is a cross-sectional view taken on line III—III of FIG. 5(a). The configuration of a mechanical sensor in this embodiment will be explained by referring to these two figures.

In the central part on top of a glass substrate 31 having a long side 10 mm, a short side 5 mm, and a thickness 0.5 mm, a magneto-resistance element 32 is formed linearly in a short side direction of the substrate 31 (width 50 μm, length 3 mm, thickness 0.1 μm), and the magneto-resistance element 32 is connected to input-output terminals 33a and 33b. In addition, an insulating layer 34 is formed covering this magneto-resistance element 32. On top of the insulating layer 34, a magnetostrictive layer 35 provided with a linear slit is formed in such a position that the magnetostrictive layer 35 partially overlaps with the magneto-resistance element 32. The structure, material, and manufacturing process of the magneto-resistance element 32 and the insulating layer 34 are the same as those in Example 1. As for the magnetostrictive layer 35, the thickness and the manufacturing process are the same. On both of their sides, magnet layers 36a and 36b of 2 square mm and 2 μm thick are formed. The magnet layers 36a, 36b comprise magnets made of CoPt alloy manufactured by a sputtering method, and the magnets are polarized in a longitudinal direction of the substrate.

Next, an operation of the mechanical sensor in this embodiment will be explained. Among the in-plane directions of the substrate 31, the longitudinal direction of the substrate is defined as S-direction, and the longitudinal direction of the magneto-resistance element 32 (axis direction of easy magnetization of the magneto-resistance element 32) is defined as E-direction. Furthermore, stress was applied to be in the S-direction of the substrate surface, and property change was measured.

Since the magnet layers 36a, 36b are polarized in the S-direction, magnetic flux 37 arising from these magnets moves along the S-direction and passes through the magnetostrictive layer 35 and the magneto-resistance element 32, as shown in FIG. 6. Furthermore, the magnet layers 36a, 36b are formed and positioned so that a value of resistance in the magneto-resistance element 32 becomes $R_0-\frac{1}{2}\Delta R$ when stress is not applied.

When the stress is applied in the S-direction, according to the same reason mentioned earlier in Example 1, magnetic flux density of the magnetic flux 37 changes, and the value of resistance in the magnetic resistive element 32 changes. Also in this embodiment, the excitation direction and the stress direction are designed to match. When a gap arises between the stress direction and the excitation direction, the output result is the same as in Example 1.

The change of resistance value against the stress was 1.4% when the stress was applied to create −50 ppm to +50 ppm of distortion on the surface of the substrate 31.

In the above-mentioned Examples 1 to 3, a Fe-group amorphous alloy manufactured by a sputtering method was used for the magnetostrictive layer. However, it is natural that the same type of sensor can be constructed using other ferromagnetic layers having magnetostriction.

In the above-mentioned Examples 1 to 3, a NiFe alloy film showing anisotropic magneto-resistance effect which was manufactured by a deposition method was used for the magneto-resistance element. However, it is clear from the configuration of the magnetic circuit in the sensor of this invention that the same type of sensor can be constructed using other ferromagnetic layers whose value of resistance changes according to a magnetic field (for example, Giant magneto-resistance effect; Bulletin of Japanese Society for Applied Magnetics, No. 16, pp 614–635).

The invention may be embodied in other forms without departing from the spirit or essential characteristics thereof. The embodiments disclosed in this application are to be considered in all respects as illustrative and not as restrictive. The scope of the invention is indicated by the appended claims rather than by the foregoing description, and all changes which come within the meaning and range of equivalency of the claims are intended to be embraced therein.

What is claimed is:

1. A mechanical sensor, comprising:

a first ferromagnetic layer having magnetostriction;

a second ferromagnetic layer, separate from the first ferromagnetic layer, and having magneto-resistance effect;

a magnetic field generating means for exciting said first and second ferromagnetic layers; and a substrate which integrally support said first and second ferromagnetic layers and said magnetic field generating means, wherein a change of a magnetic flux density passing through said first and second ferromagnetic layers resulting from a change of magnetic properties due to stress is detected as a change of resistance value arising from the magneto-resistance effect.

2. The mechanical sensor as claimed in claim 1, wherein a magnetic field which excites the first and second ferromagnetic layers is oriented in a direction which is substantially parallel to a direction of the stress.

3. The mechanical sensor as claimed in claim 1, wherein an electric insulating layer is further provided between the substrate and the first ferromagnetic layer having magnetostriction.

4. The mechanical sensor as claimed in claim 1, wherein an electric insulating layer is further provided between the first ferromagnetic layer having magnetostriction and the second ferromagnetic layer having magneto-resistance effect.

5. The mechanical sensor as claimed in claim 1, wherein the second ferromagnetic layer having magneto-resistance effect is connected to input-output terminals of electric power.

6. The mechanical sensor as claimed in claim 1, wherein a non-magnetic layer is further provided between the first ferromagnetic layer having magnetostriction and the second ferromagnetic layer having magneto-resistance effect for magnetically separating these two layers, and wherein the first and second ferromagnetic layers are excited by electric current passing through the second ferromagnetic layer having magneto-resistance effect.

7. The mechanical sensor as claimed in claim 6, wherein the first and second ferromagnetic layers and the non-magnetic layer are formed by a vapor phase film formation method or a liquid phase film formation method.

8. The mechanical sensor as claimed in claim 1, further comprising:

a non-magnetic conductive layer formed between the first and second ferromagnetic layers; and a non-magnetic insulating layer for electrically insulating the first and second ferromagnetic layers, wherein the first and second ferromagnetic layers are excited by an electric current passing through the conductive layer.

9. The mechanical sensor as claimed in claim 8, wherein the non-magnetic conductive layer is connected to input-output terminals of electric power which are provided separately from input-output terminals of electric power connected to the second ferromagnetic layer.

10. The mechanical sensor as claimed in claim 8, wherein the first and second ferromagnetic layers, the non-magnetic conductive layer, and the non-magnetic insulating layer are formed by a vapor phase film formation method or a liquid phase film formation method.

11. The mechanical sensor as claimed in claim 10, comprising two ferromagnetic layers having magnetostriction which are provided in parallel in a S cross-sectional direction, a gap section created between said two ferromagnetic layers having magnetostriction is provided with the second ferromagnetic layer having magneto-resistance effect which is positioned substantially parallel to these ferromagnetic layers having magnetostriction and two magnetic layers are disposed on both outside positions of said two ferromagnetic layers having magnetostriction for exciting these ferromagnetic layers having magnetostriction.

12. The mechanical sensor as claimed in claim 11, wherein the ferromagnetic layers having magnetostriction and the magnet layers are formed by a vapor phase film formation method or a liquid phase film formation method.

13. The mechanical sensor as claimed in claim 1, wherein the first ferromagnetic layer having magnetostriction comprises amorphous magnetostrictive alloy.

14. The mechanical sensor as claimed in claim 13, wherein the amorphous magnetostrictive alloy comprises at least one alloy selected from a group comprising Fe-Cr-Si-B-based, Fe-Nb-Si-B-based, Fe-V-Si-B-based, Fe-Co-Si-B-based, Fe-W-Si-B-based, Fe-Ni-Cr-Si-B-based, Fe-Ni-Nb-B-based, and Fe-Ni-Mo-B-based alloy.

15. The mechanical sensor as claimed in claim 13, wherein the amorphous magnetostrictive alloy comprises $Fe_{75}Cr_4Si_{12.5}B_{8.5}$.

16. The mechanical sensor as claimed in claim 1, wherein the second ferromagnetic layer having magneto-resistance effect comprises a NiFe alloy film.

17. The mechanical sensor as claimed in claim 1, wherein an electric insulating layer comprises $SiO_2$.

18. The mechanical sensor as claimed in claim 1, wherein the substrate comprises one substance selected from a group comprising metal, glass, and ceramics.

* * * * *